(12) United States Patent
Oguchi et al.

(10) Patent No.: US 6,650,384 B2
(45) Date of Patent: Nov. 18, 2003

(54) LIQUID CRYSTAL DISPLAY AND DISPLAY METHOD

(75) Inventors: Masayuki Oguchi, Yokohama (JP); Hiroki Iwanaga, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 10/091,229

(22) Filed: Mar. 6, 2002

(65) Prior Publication Data
US 2002/0191142 A1 Dec. 19, 2002

(30) Foreign Application Priority Data
Mar. 21, 2001 (JP) .......................... 2001-081597

(51) Int. Cl.⁷ ............................................ G02F 1/1334
(52) U.S. Cl. .................... 349/86; 349/165; 349/166; 359/296
(58) Field of Search ........................ 349/86, 87, 88, 349/89, 90, 91, 165, 166; 359/296

(56) References Cited

U.S. PATENT DOCUMENTS 4,305,807 A * 12/1981 Somlyody ................. 349/166
4,477,805 A * 10/1984 Arton et al. ................. 345/94
6,259,506 B1 * 7/2001 Lawandy ................... 349/193

OTHER PUBLICATIONS

B. Comiskey, et al., "Late–News Paper: Electrophoretic Ink: A Printable Display Material", SID 97 Digest, 1997, pp. 75–76.
P. Drzaic, et al., "A Printed and Rollable Bistable Electronic Display", SID 98 Digest, 1998, pp. 1131–1134.
Barrett Comiskey, et al., "An Electrophoretic Ink For All-Printed Reflective Electronic Displays", Nature, vol. 394, Jul. 16, 1998, pp. 253–255.

* cited by examiner

*Primary Examiner*—Robert H. Kim
*Assistant Examiner*—Michael H Caley
(74) *Attorney, Agent, or Firm*—Oblon, Spivak, McClelland, Maier & Neustadt, P.C.

(57) ABSTRACT

There is provided a liquid crystal display, including a substrate and pixels arrayed on the substrate, each of the pixels including an electric field sensitive layer which includes, an N-type liquid crystal material containing a liquid crystal substance, a dichroic dye and an isotropic dye, and particles dispersed in the N-type liquid crystal material and configured to migrate in the N-type liquid crystal material by electrophoresis.

20 Claims, 6 Drawing Sheets

LIQUID CRYSTAL DISPLAY AND DISPLAY METHOD

CROSS-REFERENCE TO RELATED APPLICATIONS

This application is based upon and claims the benefit of priority from the prior Japanese Patent Application No. 2001-081597, filed Mar. 21, 2001, the entire contents of which are incorporated herein by reference.

BACKGROUND OF THE INVENTION

1. Field of the Invention

The present invention relates to a liquid crystal display and a display method, particularly, to a liquid crystal display utilizing the combination of a liquid crystal display technology and an electrophoretic display technology and its display method.

2. Description of the Related Art

In the electrophoretic display technology, an image is displayed by utilizing the electrophoretic phenomenon of particles dispersed in a dispersion medium. The dispersion medium containing such particles, i.e., electrophoretic particles, is called an electric field sensitive pigment, i.e., an electrophoretic E-ink or an E-ink. The electrophoretic display technology is classified into two types described below.

Figure 1A:
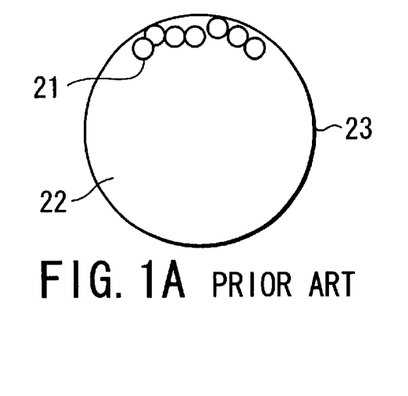
FIG. 1A schematically shows as an example the construction of a typical microcapsule used in the conventional electrophoretic display technology.

In one type of electrophoretic display technology, used is a microcapsule prepared by dispersing charged titania particles 21 in a colored solvent 22 and encapsulating the resultant dispersion with a transparent film 23, as shown in FIG. 1A. In this technology, the displayed color can be switched between the white color of the titania particles and the color of the solvent by applying voltage across the microcapsule to cause the migration of the titania particles 21 within the transparent film 23.

Figure 1B:
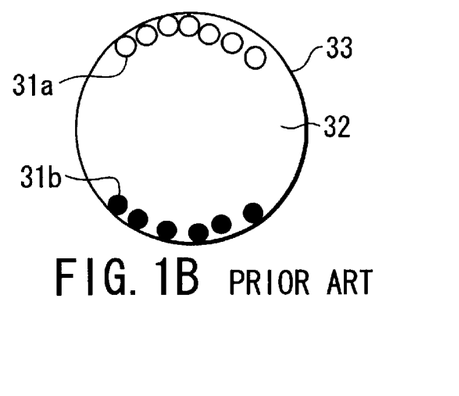
FIG. 1B schematically shows as another example the construction of a typical microcapsule used in the conventional electrophoretic display technology.

In the other type of electrophoretic display technology, used is a microcapsule prepared by dispersing charged particles 31a and 31b differing from each other in the polarity of the charge and in the color in a transparent solvent 32, and encapsulating the resultant dispersion with a transparent film 33. In the case of using the microcapsule thus prepared, it is possible to switch the displayed color between the color of the charged particle 31a and the color of the charged particle 31b depending on the state that the charged particles 31a are present on the side of the observer and the state that the charged particles 31b are present on the side of the observer.

Incidentally, these technologies are described in, for example, the publications given below:

[1] B. Comiskey, J. D. Albert and J. Jacobson, Digest of SID97, p75;

[2] P. Drzaic, B. Comiskey, J. D. Albert, L. Zhang, A. Loxley and R. Feeney, Digest of SID98, p1131; and

[3] Barrett Comiskey, J. D. Albert, Hidekazu Yoshizawa and Joseph Jacobson, Nature, 394, p253 (1998).

The electrophoretic display technology permits obtaining a high contrast. However, it is difficult to provide a full color image. To be more specific, in the display technology using the microcapsule shown in FIG. 1A, the displayed color is switched between two colors, i.e., the white color produced by the light-scattering by the titania particles 21 and the color of the colored solvent 22, with the result that a color filter is required for producing a full color image. In the display technology using the microcapsule shown in FIG. 1B, the displayed color is also switched between two colors, i.e., the color of the electrophoretic fine particles 31a and the color of the electrophoretic fine particles 31b, with the result that it is also necessary to use a color filter for producing a full color image. In the case of using a color filter, however, the light utilization efficiency is lowered so as to lower the contrast.

In order to produce a full color image by the electrophoretic display technology, proposed is a method of coloring appropriately the electrophoretic particles. According to this coloring method, it is unnecessary to use a color filter. However, the reflectance is lowered in the case of displaying a white image. Also, the reflectance is increased in the case of displaying a black image. It follows that the image quality is lowered.

In order to realize a full color display while maintaining a high contrast, it is absolutely necessary to switch the displayed color among three colors of white, black and a color other than white and black in a single microcapsule. However, such a technology has not yet been developed to date.

In order to overcome the problem pointed out above, the present inventors have proposed an electrophoretic display technology that permits switching the displayed color among three colors in a single microcapsule. In the display technology proposed by the present inventors, used is a microcapsule prepared by dispersing fine particles such as titania particles in a P-type liquid crystal material containing a liquid crystal substance, a dichroic dye and an isotropic dye, and encapsulating the resultant dispersion with a transparent film. Where the dichroic dye contained in the microcapsule can exhibit a complementary color of the isotropic dye, it is possible to switch the displayed color among three colors of white, black and a color other than white and black in a single capsule. It follows that the electrophoretic display technology proposed by the present inventors makes it possible to achieve a full color display while maintaining a high contrast characterizing the display of electrophoresis mode.

It is expected to apply the electrophoretic display to an electronic paper. In such an application, it is required to decrease the power consumption of the display. Therefore, it is desirable for the electrophoretic display to be capable of holding the image displayed by the voltage application even after stopping the application of voltage. In other words, it is desirable for the electrophoretic display to exhibit a memory function.

The display noted above certainly exhibit the memory function in the case where an image is displayed by the electrophoresis mode. However, the memory function is not exhibited in the case where an image is displayed by the guest-host mode. To be more specific, it is certainly possible to hold white and black colors even after stopping the application of voltage. However, it is impossible to hold the color other than white and black. Such being the situation, a clear full color image, which is displayed under the state that voltage is applied, is switched into a monochromatic image immediately after stopping the application of voltage.

BRIEF SUMMARY OF THE INVENTION

According to a first aspect of the present invention, there is provided a liquid crystal display, comprising a substrate and pixels arrayed on the substrate, each of the pixels comprising an electric field sensitive layer which comprises an N-type liquid crystal material containing a liquid crystal substance, a dichroic dye and an isotropic dye, and particles dispersed in the N-type liquid crystal material and configured to migrate in the N-type liquid crystal material by electrophoresis.

According to a second aspect of the present invention, there is provided a liquid crystal display, comprising a substrate and pixels arrayed on the substrate, each of the pixels comprising a first electric field sensitive layer which comprises an N-type liquid crystal material containing a first liquid crystal substance, a first dichroic dye and a first isotropic dye, and first particles dispersed in the N-type liquid crystal material and configured to migrate in the N-type liquid crystal material by electrophoresis, and a second electric field sensitive layer which is adjacent to the first electric field sensitive layer and comprises a P-type liquid crystal material containing a second liquid crystal substance, a second dichroic dye and a second isotropic dye, and second particles dispersed in the P-type liquid crystal material and configured to migrate in the P-type liquid crystal material by electrophoresis.

According to a third aspect of the present invention, there is provided a method of displaying an image, comprising changing a state of a first electric field sensitive layer among first to third states, the first electric field sensitive layer comprising an N-type liquid crystal material which contains a first liquid crystal substance, a first dichroic dye and a first isotropic dye, and first particles dispersed in the N-type liquid crystal material and configured to migrate in the N-type liquid crystal material by electrophoresis, wherein the first state is a state that the first particles are gathered in an observer side region of the first electric field sensitive layer, the second state is a state that the first particles are gathered in a back side region of the first electric field sensitive layer which is apart from the observer side region of the first electric field sensitive layer and an alternating-current voltage is applied to the first electric field sensitive layer, and the third state is a state that the first particles are gathered in the back side region of the first electric field sensitive layer and no voltage is applied to the first electric field sensitive layer.

The term "dichroic dye" represents a dye having a dichroic ratio larger than 1.5, and the term "isotropic dye" represents a dye or pigment having a dichroic ratio equal to or smaller than 1.5. The term "N-type liquid crystal material" represents a liquid crystal material having a negative dielectric anisotropy, and the term "P-type liquid crystal material" represents a liquid crystal material having a positive dielectric anisotropy. Further, the term "observer side region" represents a region facing the observer, and the term "back side region" represents a region remote from the observer, compared with the "observer side region".

It is possible for the method according to the third aspect of the present invention to further comprise changing the state of a second electric field sensitive region among fourth to sixth states. In this case, it is possible for the second electric field sensitive layer to comprise a P-type liquid crystal material containing a second liquid crystal substance, a second dichroic dye and a second isotropic dye, and second particles dispersed in the P-type liquid crystal material and configured to migrate in the P-type liquid crystal material by electrophoresis. It is possible for the fourth state to be a state that the second particles are gathered in a observer side region of the second electric field sensitive layer. It is possible for the fifth state to be a state that the second particles are gathered in a back side region of the second electric field sensitive layer and an AC voltage is applied to the second electric field sensitive layer. Further, it is possible for the sixth state to be a state that the second particles are gathered in the back side region of the second electric field sensitive layer and no voltage is applied to the second electric field sensitive layer.

It is possible for the display according to the first aspect of the present invention to further comprise a transparent film encapsulating an N-type liquid crystal material and particles so as to form a microcapsule. Likewise, in each of the second and third aspects of the present invention, it is possible for the first electric field sensitive layer to further comprise a first transparent film encapsulating an N-type liquid crystal material and first particles so as to form a first microcapsule. Further, in each of the second and third aspects of the present invention, it is possible for the second electric field sensitive layer to further comprise a second transparent film encapsulating a P-type liquid crystal material and second particles so as to form a second microcapsule.

In the first aspect of the present invention, it is possible for a dichroic ratio of the dichroic dye to be 3 or more. Likewise, in each of the second and third aspects of the present invention, it is possible for a dichroic ratio of the first dichroic dye to be 3 or more and for a dichroic ratio of the second dichroic dye to be 3 or more.

In the first aspect of the present invention, it is possible for the dichroic dye to exhibit a complementary color of the isotropic dye. Likewise, in each of the second and third aspects of the present invention, it is possible for the first dichroic dye to exhibit a complementary color of the first isotropic dye and for the second dichroic dye to exhibit a complementary color of the second isotropic dye. Also, in the third aspect of the present invention, it is possible for the color of the first electric field sensitive layer under the second state to be equal to the color of the second electric field sensitive layer under the sixth state and for the color of the first electric field sensitive layer under the third state to be equal to the color of the second electric field sensitive layer under the fifth state.

In each of the first and second aspects of the present invention, it is possible for each of the pixels to be configured to exhibit white, black and a color other than white and black.

In the first aspect of the present invention, it is possible for the particles to have a mean diameter equal to or less than 0.4 $\mu$m. Similarly, in each of the second and third aspects of the present invention, it is possible for the first particles to have a mean diameter equal to or less than 0.4 $\mu$m and for the second particles to have a mean diameter equal to or less than 0.4 $\mu$m.

In the second aspect of the present invention, it is possible for each of the pixels to further comprise a pixel electrode. It is possible for the pixel electrode to comprise, for example, a first sub-pixel electrode between the substrate and the first electric field sensitive layer and a second sub-pixel electrode between the substrate and the second electric field sensitive layer. In this case, it is possible for each of the pixels to further comprise a first switching element electrically connected to the first sub-pixel electrode and a second switching element connected to the second sub-pixel electrode. Also, it is possible for each of the pixels to further comprise a counter electrode facing the pixel electrode such that the first and second electric field sensitive layers sandwiched between the pixel electrode and the counter electrode.

Further, in the second aspect of the present invention, it is possible for the pixels to comprise a first pixel in which each of the first dichroic dye and the first isotropic dye can exhibit a cyan color, and each of the second dichroic dye and the second isotropic dye can exhibit a red color, a second pixel in which each of the first dichroic dye and the first isotropic dye can exhibit a magenta color and each of the second dichroic dye and the second isotropic dye can exhibit a green color, and a third pixel in which each of the first dichroic dye and the first isotropic dye can exhibit a yellow color and each of the second dichroic dye and the second isotropic dye can exhibit a blue color.

DETAILED DESCRIPTION OF THE INVENTION

Some embodiments of the present invention will now be described with reference to the accompanying drawings. In the following description, the like constituting elements are denoted by the same reference numerals so as to avoid an overlapping description.

Figure 2:
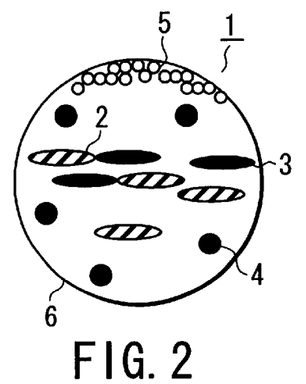
FIG. 2 schematically shows as an example the construction of a microcapsule that can be used in a display according to a first embodiment of the present invention.

FIG. 2 schematically shows as an example the construction of a microcapsule 1 that can be used in the display according to a first embodiment of the present invention. As shown in the drawing, the microcapsule 1 includes an N-type liquid crystal material containing an N-type liquid crystal substance (N-type liquid crystal molecule) 2, a dichroic dye 3 and an isotropic dye 4, and particles 5 dispersed in the N-type liquid crystal material. These liquid crystal material and particles 5 are encapsulated with a transparent film 6 so as to form the microcapsule 1.

Prior to description of the display technology using the microcapsule 1 of the particular construction described above, a microcapsule using a P-type liquid crystal material in place of the N-type liquid crystal material will now be described with reference to FIGS. 3A to 3E.

FIGS. 3A to 3E collectively show schematically an example of the electrophoretic display technology performed by the microcapsule using the P-type liquid crystal material. The upper side in the drawing represents the observer side, and the lower side in the drawing represents the back side. FIGS. 3A to 3E depict the states that the liquid crystal molecules are aligned ideally in a microcapsule 10 in order to facilitate understanding.

Figure 3A:
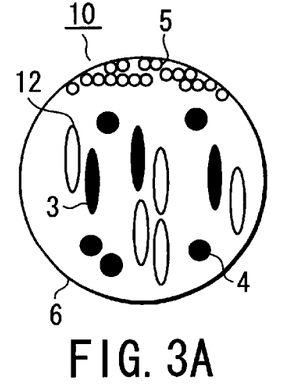
FIGS. 3A to 3E collectively show as an example the electrophoretic display technology performed by a microcapsule using a P-type liquid crystal material.

The microcapsule 10 shown in FIGS. 3A to 3E is substantially equal in construction to the microcapsule 1 shown in FIG. 2, except that a P-type liquid crystal material (P-type liquid crystal molecule) 12 is used in place of the N-type liquid crystal material 2. If a DC voltage is applied to the microcapsule 10 in a vertical direction in the drawing, the particles 5 such as fine titania particles migrate in the vertical direction so as to be gathered in, for example, an upper region within the microcapsule 10, as shown in FIG. 3A. Under the particular state, the observer recognizes the white color caused by the light reflection from the titania particles 5. In this case, the dichroic dye 3 are aligned in the direction of the electric field and, thus, scarcely absorbs light. As a result, it is expected that the reflectance obtained under the state shown in FIG. 3A is higher than the reflectance obtained when the white color is displayed by the conventional microcapsule shown in FIG. 1A.

Incidentally, the state shown in FIG. 3A can also be obtained by applying a DC voltage to the microcapsule 10 in the vertical direction in the drawing so as to gather the particles 5 in an upper region of the microcapsule 10, followed by applying an AC voltage having a sufficiently high frequency to the microcapsule 10. If the AC voltage applied to the microcapsule 10 has a sufficiently high frequency, it is possible to align the dichroic dye 3 in the direction of the electric field without causing the migration of particles 5 from the upper region.

Figure 3B:
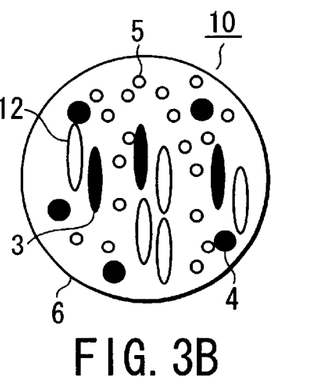

If an AC voltage having a suitable frequency is applied to the microcapsule 10 in the vertical direction in the drawing, the particles 5 are dispersed substantially uniformly in the liquid crystal material, and the dichroic dye 3 scarcely absorb the light since the dichroic dye 3 are aligned in the direction of the electric field as shown in FIG. 3B. Under this state, the observer recognizes the color of the isotropic dye 4.

Figure 3C:
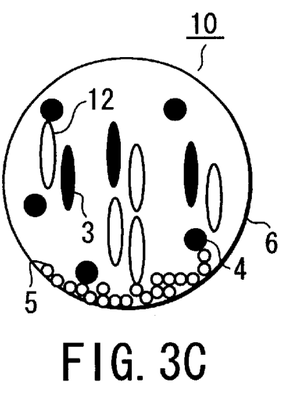

If a DC voltage is applied to the microcapsule 10 in the direction opposite to the direction referred to in conjunction with FIG. 3A, the particles 5 are gathered in a lower region within the microcapsule 10, as shown in FIG. 3C. If an AC voltage having a sufficiently high frequency is applied in the next step to the microcapsule 10 in the vertical direction in the drawing, the dichroic dye 3 can be aligned in the direction of the electric field without causing the migration of particles 5 from the lower region within the microcapsule 10. The color of the isotropic dye 4 can be recognized by the observer under this state, too, as under the state shown in FIG. 3B. However, the particles 5 are not present in the observer side region under the state shown in FIG. 3C. As a result, the light scattering caused by the particles 5 can be suppressed under the state shown in FIG. 3C, compared with the light scattering under the state shown in FIG. 3B, so as to realize a higher light absorbance.

Figure 3D:
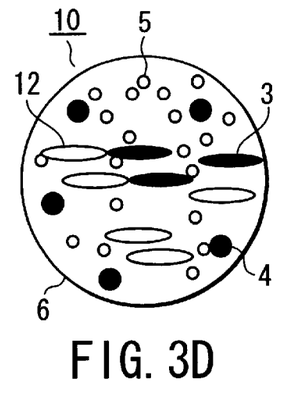

If the application of AC voltage to the microcapsule 10 under the state shown in FIG. 3B is stopped, the particles 5 are held dispersed substantially uniform in the liquid crystal material as shown in FIG. 3D. However, the dichroic dye 3 changes the alignment state thereof, and ideally, is aligned in the lateral direction in the drawing. As a result, not only the isotropic dye 4 but also the dichroic dye 3 can absorb a light. Therefore, where the color of the dichroic dye 3 is complementary to the color of the isotropic dye 4, the observer recognizes the black color because of the subtractive color mixing.

Figure 3E:
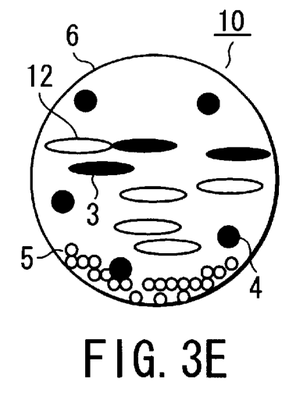

If the application of AC voltage to the microcapsule 10 under the state shown in FIG. 3C is stopped, the particles 5 keep being gathered in the lower region of the microcapsule 10 as shown in FIG. 3E. However, the dichroic dye 3 is changed the alignment state thereof, and ideally, is aligned in the lateral direction in the drawing. As a result, even under this state, the observer recognizes the black color because of the subtractive color mixing as under the state shown in FIG. 3D. However, under the state shown in FIG. 3E, the particles 5 are not present in the observer side region. It follows that, under the state shown in FIG. 3E, the light scattering caused by the particles 5 is suppressed, compared with the light scattering under the state shown in FIG. 3D, so as to realize a higher light absorbance.

In the description given above, a DC voltage application and an AC voltage application are employed in combination so as to switch the displayed color among three colors of white, black and a color other than white and black. However, it is also possible to perform such a switching of the displayed color by applying a plurality of AC voltages differing from each other in frequency. To be more specific, the orientation of the dichroic dye 3 can be controlled by the voltage whether the applied voltage may be a DC voltage or an AC voltage. On the other hand, the position of the particles 5 can be controlled by the direction and frequency of the applied voltage. To be more specific, where the frequency is not higher than a predetermined level, the position of the particles 5 can be controlled by the direction of the voltage. However, if the frequency exceeds the predetermined level, the position of the particles 5 ceases to respond to the AC voltage. The switching of the displayed color can be performed by utilizing the phenomenon noted above.

The electrophoretic display technology using the microcapsule shown in FIG. 2 will now be described with reference to FIGS. 4A to 4C.

Figure 4A:
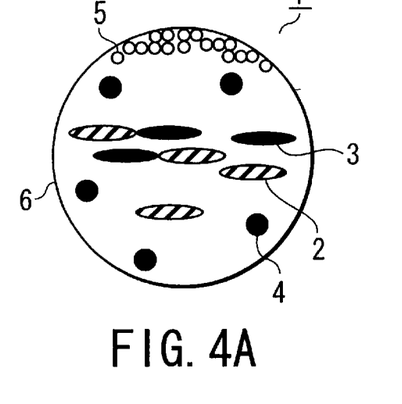
FIGS. 4A to 4C collectively show as an example the electrophoretic display technology using the microcapsule shown in FIG. 2.
Figure 4B:
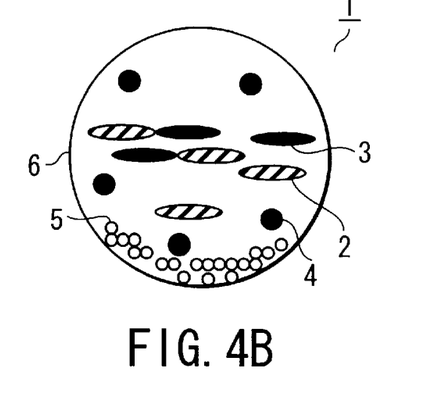
Figure 4C:
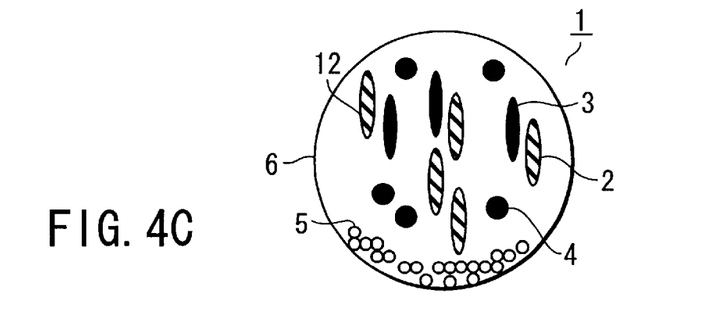

FIGS. 4A to 4C schematically exemplify the electrophoretic display technology using the microcapsule 1 shown in FIG. 1. In FIGS. 4A to 4C, the upper side represents the observer side, and the lower side represents the back side. Also, FIGS. 4A to 4C show the states that the liquid crystal molecules are ideally aligned in order to facilitate understanding.

If a DC voltage is applied to the microcapsule 1 in a vertical direction in the drawing, the particles 5 such as titania fine particles migrate in the vertical direction so as to be gathered in, for example, an upper region within the microcapsule 10. Under this state, the observer recognizes the white color caused by the light reflection from the titania particles 5. Incidentally, the state shown in FIG. 4A can also be obtained by applying a DC voltage to the microcapsule 1 in the vertical direction in the drawing so as to gather the particles 5 in an upper region within the microcapsule 1, followed by applying an AC voltage having a sufficiently high frequency to the microcapsule 1. If the frequency of the AC voltage applied to the microcapsule 1 is sufficiently high, it is possible to align the dichroic dye 3 in the direction of the electric field without causing the migration of particles 5 from the upper region.

If a DC voltage is applied to the microcapsule 1 in the direction opposite to the direction referred to above in conjunction with FIG. 4A, the particles 5 are gathered in a lower region within the microcapsule 1, as shown in FIG. 4B. If an AC voltage having a sufficiently high frequency is applied in the next step to the microcapsule 1 in the vertical direction in the drawing, it is possible to align the dichroic dye 3 in a direction substantially perpendicular to the direction of the electric field without causing the migration of particles 5 from the lower region within the microcapsule 1. Under this state, not only the isotropic dye 4 but also the dichroic dye 3 can absorb a light. As a result, where the color of the dichroic dye 3 is complementary to the color of the isotropic dye 4, the observer recognizes the black color because of the subtractive color mixing.

If the application of AC voltage to the microcapsule 1 under the state shown in FIG. 4B is stopped, the particles 5 keep being gathered in a lower region within the microcapsule 1, as shown in FIG. 4C. However, the dichroic dye 3 changes the alignment state thereof, and ideally, is aligned in the vertical direction in the drawing. As a result, the light absorption of the dichroic dye 3 is decreased so as to cause the observer to recognize the color of the isotropic dye 4.

In the case of using the microcapsules 1 and 10 described above, it is possible to retain the full color image displayed during the voltage application even after stopping the application of voltage.

Figure 5:
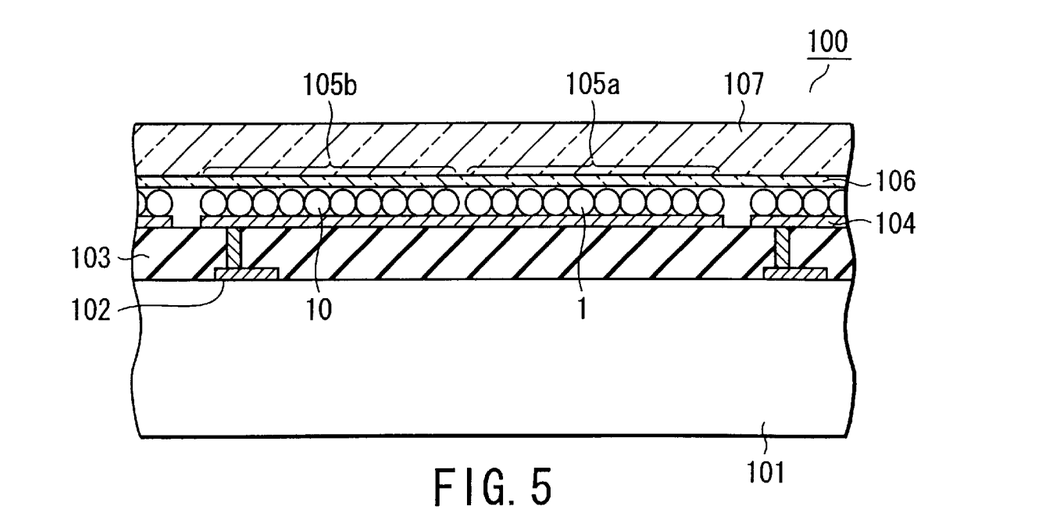
FIG. 5 is a cross-sectional view schematically showing the construction of the display according to the first embodiment of the present invention.

FIG. 5 is a cross-sectional view schematically showing the construction of a display according to the first embodiment of the present invention. As shown in the drawing, the display 100 has a substrate 101. It is possible for the substrate 100 to be a hard substrate such as a glass plate or a flexible substrate such as a thin plastic plate.

Arranged on the substrate 101 are a switching element 102 and a wiring (not shown) electrically connected to the switching element 102. It is possible to use, for example, a transistor such as a thin film transistor (TFT) as the switching element 102.

An insulating film 103 is formed on that surface of the substrate 101 on which is arranged the switching element 102. A contact hole is formed in the insulating film 103, and a pixel electrode 104 is electrically connected to the switching element 102 via the contact hole.

An electric field sensitive layer 105a including the microcapsules 1 and another electric field sensitive layer 105b including the microcapsules 10 are juxtaposed on the pixel electrode 104. It is possible to form the electric field sensitive layers 105a and 105b by print process using coating solutions containing the microcapsules 1 and 10, respectively.

A counter electrode 106 and a protective layer 107 are provided successively on the electric field sensitive layers 105a and 105b.

Incidentally, where the upper region is the observer side in FIG. 5, each of the counter electrode 106 and the protective layer 107 is made of a transparent material. Conversely, where the lower region is the observer side, each of the substrate 101, the insulating film 103 and the pixel electrode 104 is made of a transparent material.

Figure 6A:
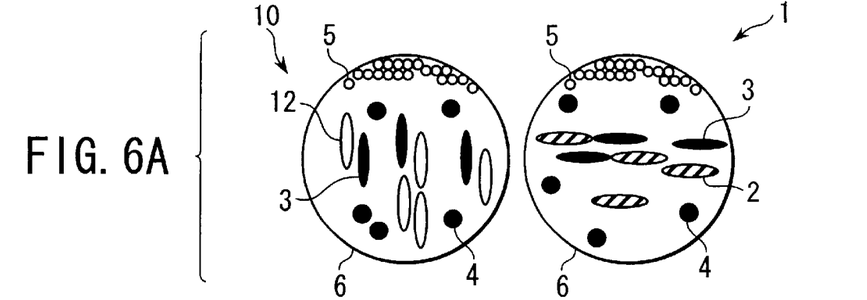
FIGS. 6A to 6C collectively show schematically the display method using the display shown in FIG. 5.
Figure 6B:
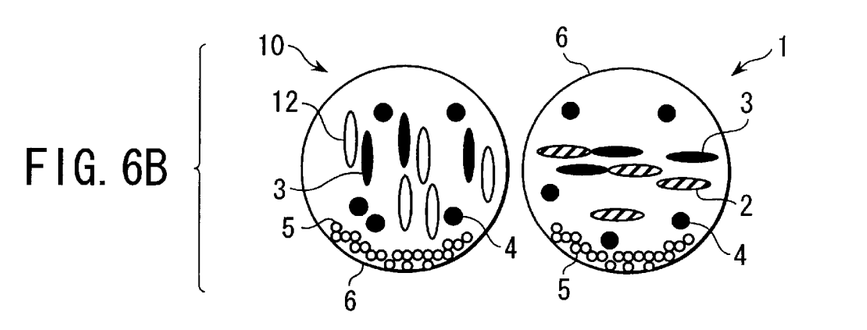
Figure 6C:
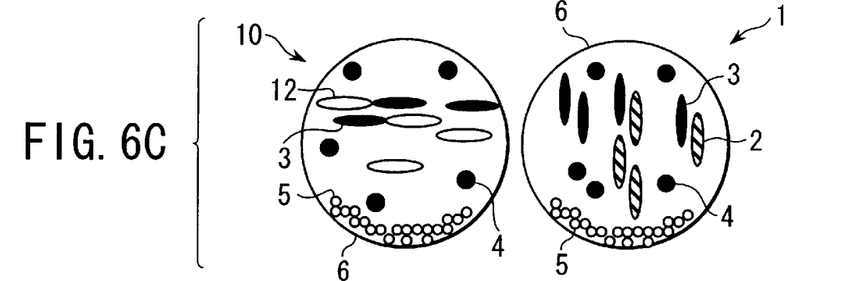

FIGS. 6A to 6C schematically show the display method using the display 100 shown in FIG. 5. Incidentally, in FIGS. 6A to 6C, the upper side is the observer side, and the lower side is the back side. Also, the states that the liquid crystal molecules are ideally aligned are shown in FIGS. 6A to 6C in order to facilitate understanding.

As described above, in the display 100, the electric field sensitive layer 105*a* including the microcapsules 1 and the electric field sensitive layer 105*b* including the microcapsules 10 are juxtaposed on the single pixel electrode 104. Therefore, if a DC voltage is applied between the pixel electrode 104 and the counter electrode 106, the particles 5 are gathered in an upper region in each of the microcapsules 1 and 10 as shown in FIG. 6A. In this case, both the microcapsules 1 and 10 exhibit the white color. The particular state is called state [1].

Incidentally, both the microcapsules 1 and 10 continue to exhibit the white color even after state [1] is changed into state [2] that the application of voltage between the pixel electrode 104 and the counter electrode 106 is stopped.

If a DC voltage is applied between the pixel electrode 104 and the counter electrode 106 in the direction opposite to that referred to above in conjunction with FIG. 6A, the particles 5 are gathered in a lower region within each of the microcapsules 1 and 10 as shown in FIG. 6B. If an AC voltage having a sufficiently high frequency is applied in the next step between the pixel electrode 104 and the counter electrode 106, it is possible to align the dichroic dye 3 within the microcapsule 1 in a direction perpendicular to the electric field and to align the dichroic dye 3 within the microcapsule 10 in the direction of the electric field so as to provide state [3]. Under state [3], the microcapsule 1 exhibits a black color if the color of the dichroic dye 3 is complementary to the color of the isotropic dye 4, and the microcapsule 10 exhibits the color of the isotropic dye 4. In other words, the pixel exhibits the color of the isotropic dye 4 under state [3].

Incidentally, the light utilization efficiency per pixel under state [3] is half the value for the case where both the microcapsules 1 and 10 exhibit the color of the isotropic dye 4. However, the color purity under state [3] is substantially equal to that for the case where both the microcapsules 1 and 10 exhibit the color of the isotropic dye 4.

If the application of AC voltage to the microcapsules 1 and 10 under the state shown in FIG. 6B is stopped, the dichroic dye 3 changes the orientation thereof in each of the microcapsules 1 and 10, as shown in FIG. 6C. In the ideal case, the dichroic dye 3 in the microcapsule 1 is aligned in the vertical direction in the drawing, and the dichroic dye 3 in the microcapsule 10 is aligned in the lateral direction so as to provide state [4]. Under state [4], the microcapsule 1 exhibits the color of the isotropic dye 4, and the microcapsule 10 exhibits the black color because of the subtractive color mixing. Therefore, where the color of the isotropic dye 4 in the microcapsule 1 is equal to that of the isotropic dye 4 in the microcapsule 10, state [3] shown in FIG. 6B is substantially equivalent to state [4] shown in FIG. 6C.

The colors exhibited by the microcapsules 1 and 10 under states [1] to [4] are as summarized in the following table:

| State | [1] | [2] | [3] | [4] |
|---|---|---|---|---|
| Application of voltage | ON | OFF | ON | OFF |
| E-ink 1 | White | White | Black | Color |
| E-ink 10 | White | White | Color | Black |

The expression "Color" in the table given above represents a color other than white and black, i.e., the color of the isotropic dye 4.

It is possible to achieve a full color display during the voltage application and during non-application of voltage if the relationship shown in the table given above is utilized. This will be described with reference to FIG. 7 and FIGS. 8A to 8C.

Figure 7:
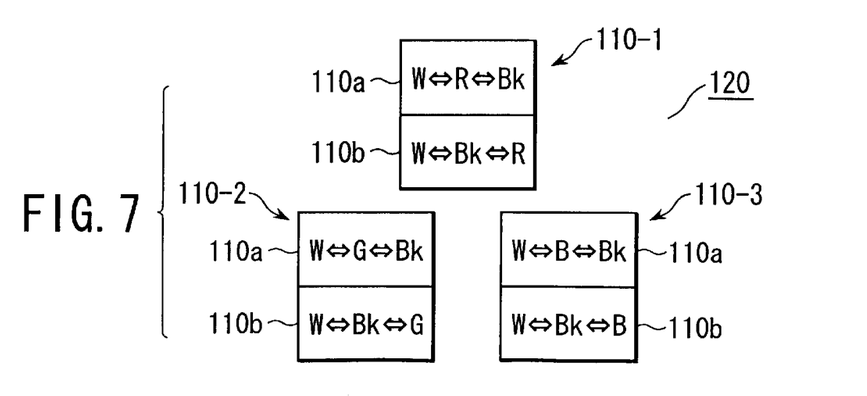
FIG. 7 is a plan view schematically showing as an example the construction of a pixel that can be utilized in the display shown in FIG. 5.
Figure 8A:
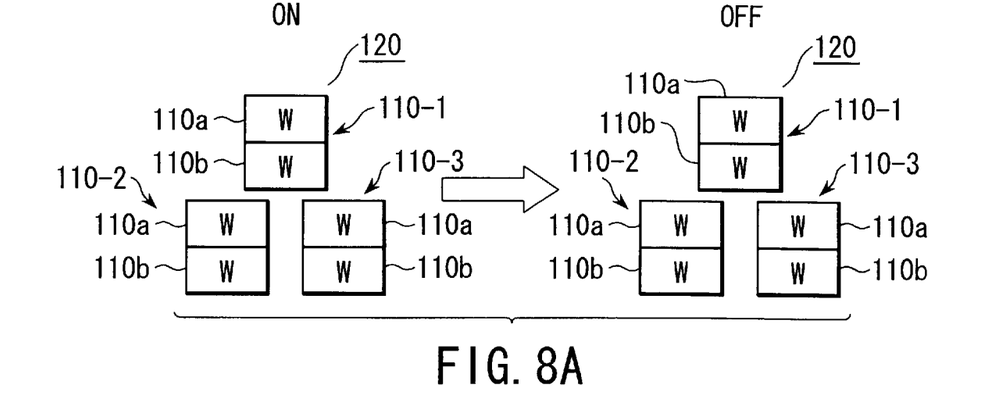
FIGS. 8A to 8C are plan views showing the colors developed by the pixels of the display employing the pixel construction shown in FIG. 7 during the voltage application and during non-application of the voltage.
Figure 8B:
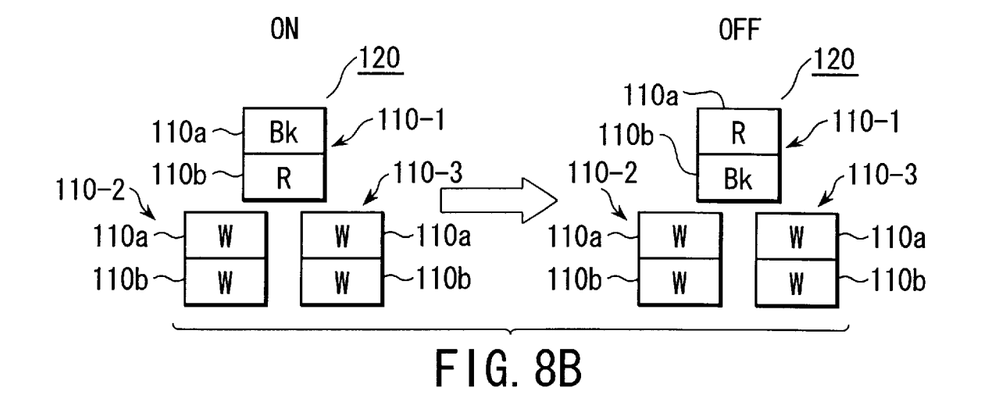
Figure 8C:
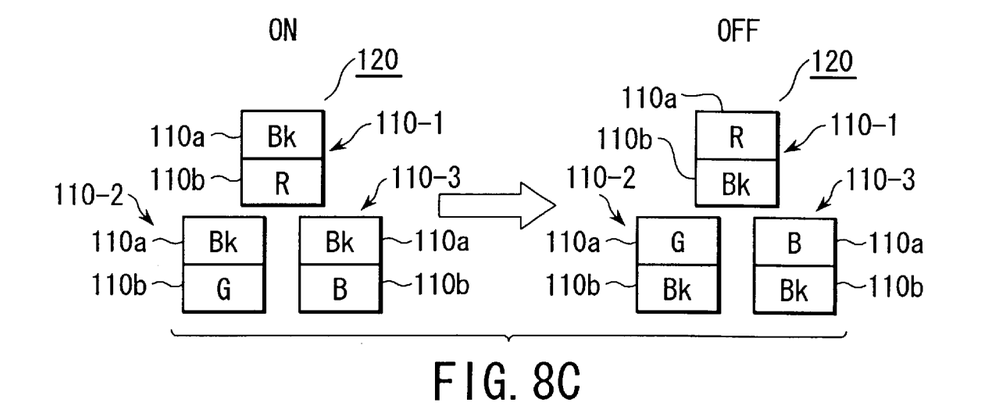

FIG. 7 is a plan view schematically exemplifying the pixel arrangement that can be utilized in the display 100 shown in FIG. 5. On the other hand, FIGS. 8A to 8C are plan views each showing the colors developed by the pixels of the display 100 employing the pixel arrangement shown in FIG. 7 during the voltage application and during non-application of the voltage. In these drawings, "W" represents white, "Bk" represents black, "R" represents red, "G" represents green, and "B" represents blue.

In the construction shown in FIG. 7, a unit region 120 is constituted by three kinds of pixels 110-1 to 110-3, and a full color display is performed by an additive color mixing in the unit region 120. The pixel 110-1 is constituted by a sub-pixel 110*a* including the electric field sensitive layer 105*a* whose isotropic dye 4 is red, and a sub-pixel 110*b* including the electric field sensitive layer 105*b* whose isotropic dye 4 is red. The pixel 110-2 is constituted by a sub-pixel 110*a* including the electric field sensitive layer 105*a* whose isotropic dye 4 is green, and a sub-pixel 110*b* including the electric field sensitive layer 105*b* whose isotropic dye 4 is green. Further, the pixel 110-3 is constituted by a sub-pixel 110*a* including the electric field sensitive layer 105*a* whose isotropic dye 4 is blue, and a sub-pixel 110*b* including the electric field sensitive layer 105*b* whose isotropic dye 4 is blue.

In the case of utilizing the particular construction, it is possible to achieve a full color display by the method described in the following.

Specifically, if a DC voltage is applied between the pixel electrode 104 and the counter electrode 106, all the sub-pixels 110*a* and 110*b* included in the pixels 110-1 to 110-3 exhibit the white color as shown on the left side of FIG. 8A, with the result that the unit region 120 also exhibits the white color. The particular state is maintained even if the application of DC voltage between the pixel electrode 104 and the counter electrode 106 is stopped, as shown on the right side of FIG. 8A.

After the pixels 110-1 to 110-3 are put under the state shown on the left side or right side of FIG. 8A, a DC voltage is applied in the opposite direction between the pixel electrode 104 and the counter electrode 106 included in the pixel 110-1, followed by applying an AC voltage having a sufficiently high frequency. As a result, the sub-pixel 110*a* of the pixel 110-1 exhibits the black color, the sub-pixel 110*b* exhibits the red color so as to cause the unit region 120 to exhibit the red color.

If the application of AC voltage between the pixel electrode 104 and the counter electrode 106 of the pixel 110-1 under the state shown on the left side of FIG. 8B is stopped, the color of the sub-pixel 110*a* of the pixel 110-1 is changed into red, and the color of the sub-pixel 110*b* is changed into black. In other words, the color of the sub-pixel 110*a* and the color of the sub-pixel 110*b* are reversed. Therefore, the unit region 120 exhibits the red color even under this state.

In the next step, a DC voltage is applied in the opposite direction between the pixel electrode 104 and the counter electrode 106 in each of the pixels 110-1 to 110-3, followed by applying an AC voltage having a sufficiently high frequency. As a result, the sub-pixel 110*a* included in each of the pixels 110-1 to 110-3 exhibits the black color, and the sub-pixels 110*b* included in the pixels 110-1 to 110-3 exhibit red, green and blue colors, respectively. It is considered reasonable to understand that the red, green and blue colors of the sub-pixels 110b are recognized as the white color because of the additive color mixing. However, the colors exhibited by these sub-pixels 110b are markedly dark, compared with the white color obtained under the state shown in FIG. 8A and the red color obtained under the state shown in FIG. 8B. It follows that the unit region 120 shown in FIG. 8C is recognized as the black color.

If the application of AC voltage between the pixel electrode 104 and the counter electrode 106 included in each of the pixels 110-1 to 110-3 under the states shown on the left side of FIG. 8C is stopped, the colors of the sub-pixels 110a included in the pixels 110-1 to 110-3 are changed into red, green and blue, respectively, and the color of each of the sub-pixels 110b is changed into black, as shown on the right side of FIG. 8C. In other words, the color of the sub-pixel 110a and the color of the sub-pixel 110b are reversed, with the result that the unit region 120 exhibits the black color even under this state.

As described above, in the case of employing the construction shown in FIG. 7 in the display 100 shown in FIG. 5, the unit region 120 keeps the color thereof unchanged even after stopping the voltage application. It follows that it is possible to maintain the full color image displayed during the voltage application even after stopping the application of voltage.

It should also be noted that a color filter is not used in the display 100 so as to make it possible to display the white color with a higher brightness, compared with the conventional display using a color filter.

As described above, in the first embodiment of the present invention, a pixel is constituted by a sub-pixel corresponding to the electric field sensitive layer 105a and another sub-pixel corresponding to the electric field sensitive layer 105b without mixing the microcapsules 1 and the microcapsules 10. However, it is possible to mix the microcapsules 1 and the microcapsules 10. In this case, it is possible to obtain the effects similar to those described above. In addition, it is possible to simplify the manufacturing process.

A second embodiment of the present invention will now be described.

Figure 9:
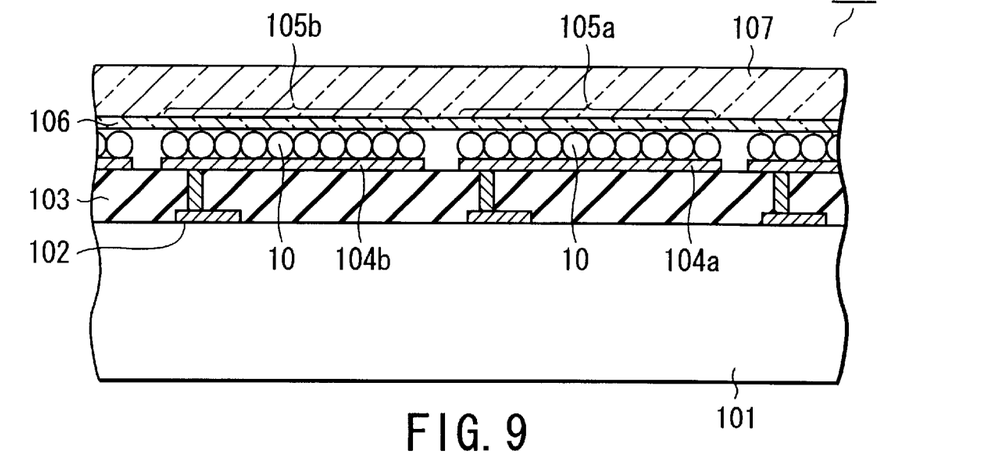
FIG. 9 is a cross-sectional view schematically showing the construction of the display according to a second embodiment of the present invention.

FIG. 9 is a cross-sectional view schematically showing the construction of a display according to a second embodiment of the present invention. The display 100 shown in the drawing is substantially equal in construction to the display 100 shown in FIG. 5, except that the pixel electrode 104 is divided into sub-pixel electrodes 104a and 104b, and that voltage can be applied independently to these sub-pixel electrodes 104a and 104b in the display 100 shown in FIG. 9. If such a construction is utilized, other states can be realized in addition to the states shown in FIGS. 6A to 6C.

Figure 10A:
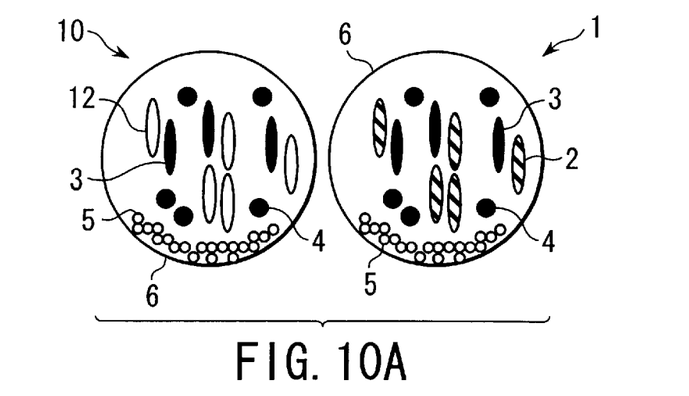
FIGS. 10A and 10B collectively show schematically the display method using the display shown in FIG. 9.
Figure 10B:
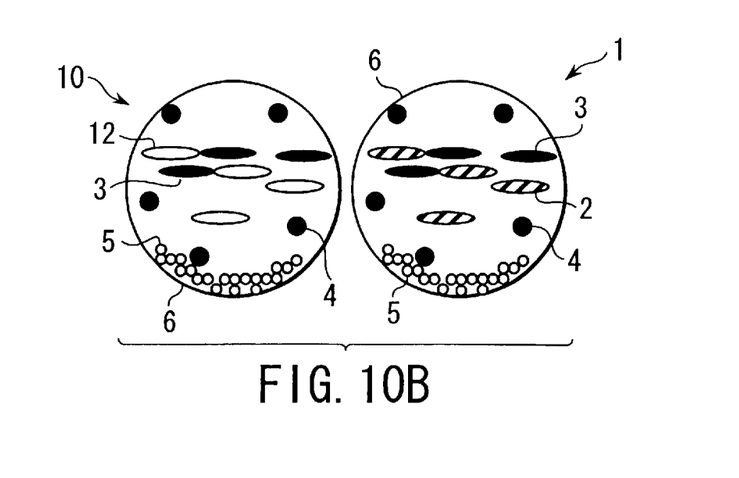

FIGS. 10A and 10B schematically show the display method using the display 100 shown in FIG. 9. Incidentally, in each of FIGS. 10A and 10B, the upper side is the observer side, and lower side is the back side. Also, the state that the liquid crystal molecules are ideally aligned is shown in each of FIGS. 10A and 10B in order to facilitate understanding.

If a DC voltage is applied between the sub-pixel electrode 104a and the counter electrode 106 and between the sub-pixel electrode 104b and the counter electrode 106, the particles 5 are gathered in a lower region in each of the microcapsules 1 and 10, as shown in FIG. 10A. Then, the application of DC voltage between the sub-pixel electrode 104a and the counter electrode 106 is stopped, followed by applying an AC voltage having a sufficiently high frequency only between the sub-pixel electrode 104b and the counter electrode 106. As a result, the dichroic dye 3 within the microcapsule 10 is aligned in the direction of the electric field. On the other hand, the dichroic dye 3 within the microcapsule 1 changes the orientation thereof from the direction perpendicular to the electric field, and ideally, is aligned in the direction of the electric field. As a result, both the microcapsules 1 and 10 exhibit the color of the isotropic dye 4 under the particular state.

Then, the particles 5 are gathered in a lower region in each of the microcapsules 1 and 10 by the method similar to that described above, followed by stopping the voltage application between the sub-pixel electrode 104a and the counter electrode 106 and allowing an AC voltage having a sufficiently high frequency to be applied only between the sub-pixel electrode 104a and the counter electrode 106. As a result, the dichroic dye 3 within the microcapsule 1 are aligned in a direction perpendicular to the electric field. On the other hand, the dichroic dyes within the microcapsule 10 changes the orientation thereof from the direction of the electric field, and ideally, is aligned in a direction perpendicular to the electric field. As a result, both the microcapsules 1 and 10 exhibit the black color under this state.

It is possible to display a clearer full color image in the case of utilizing the states shown in FIGS. 10A and 10B. This will now be described with reference to FIGS. 11A to 11C.

Figure 11A:
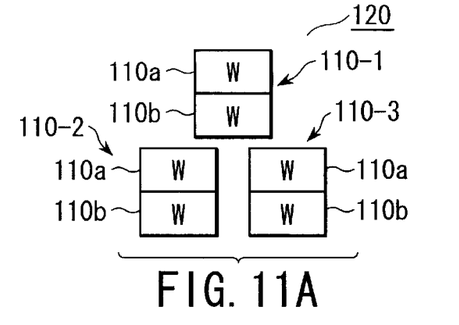
FIGS. 11A to 11C are plan views showing the colors that can be developed by the display shown in FIG. 9 in the case of employing the pixel structure shown in FIG. 7.
Figure 11B:
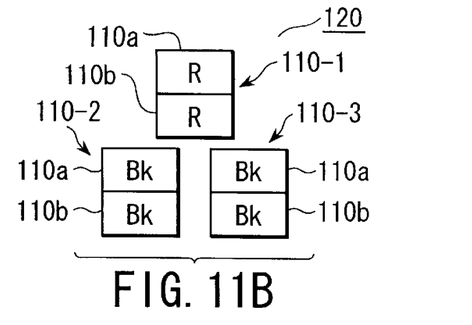
Figure 11C:
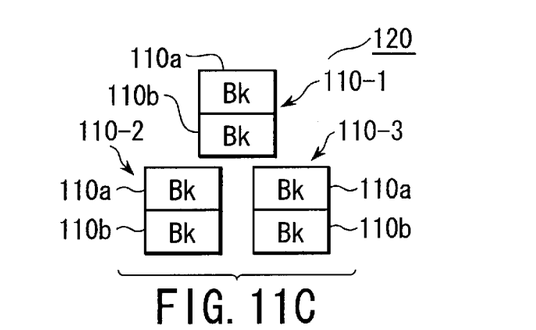
Figure 12A:
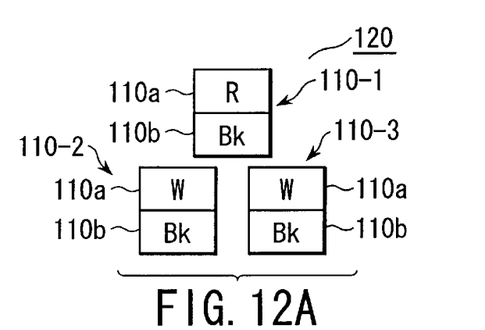
FIGS. 12A to 12D are plan views showing the tones that can be realized in the case of employing the pixel structure shown in FIG. 7 in the display shown in FIG. 9.
Figure 12B:
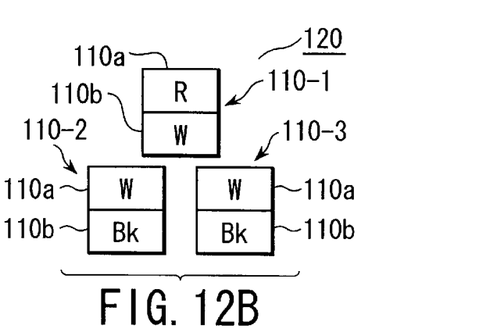
Figure 12C:
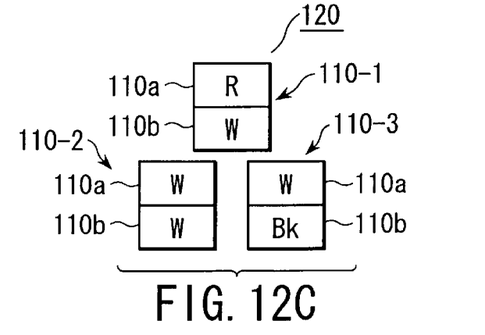
Figure 12D:
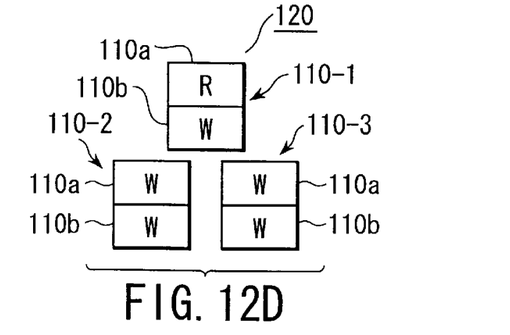

FIGS. 11A to 11C are plan views showing the colors that can be obtained when the pixel construction shown in FIG. 7 is employed in the display 100 shown in FIG. 9. The mark "W" in these drawings represents the white color, "Bk" represents the black color, "R" represents the red color, and "B" represents the blue color.

In the first step, a DC voltage is applied between the sub-pixel electrode 104a and the counter electrode 106 and between the sub-pixel electrode 104b and the counter electrode 106 in all the pixels 110-1 to 110-3. As a result, the sub-pixels 110a and 110b exhibit the color of white in all the pixels 110-1 to 110-3, and the unit region 120 also exhibits the color of white.

In the next step, a DC voltage is applied in the opposite direction between the sub-pixel electrode 104a and the counter electrode 106 and between the sub-pixel electrode 104b and the counter electrode 106 in all the pixels 110-1 to 110-3. Then, the voltage application between the sub-pixel electrode 104a of the pixel 110-1 and the counter electrode 106 is stopped, and an AC voltage having a sufficiently high frequency is applied between the sub-pixel electrode 104b of the pixel 110-1 and the counter electrode 106. Also, in the pixels 110-2 and 110-3, the voltage application between the sub-pixel electrode 104b of the pixel 110-1 and the counter electrode 106 is stopped, and an AC voltage having a sufficiently high frequency is applied between the sub-pixel electrode 104a of the pixel 110-1 and the counter electrode. As a result, each of the sub-pixels 110a and 110b of the pixel 110-1 exhibits the red color, and each of the sub-pixels 110a and 110b exhibits the black color in the pixels 110-2 and 110-3, as shown in FIG. 11B. Therefore, the unit region 120 also exhibits the red color.

Further, a DC voltage is applied in the above opposite direction between the sub-pixel electrode 104a and the counter electrode 106 and the sub-pixel electrode 104b and the counter electrode 106 in all the pixels 110-1 to 110-3. Then, the voltage application between the sub-pixel electrode 104a of the pixel 110-1 and the counter substrate 106 is stopped, and an AC voltage having a sufficiently high frequency is applied between the sub-pixel electrode 104a of the pixel 110-1 and the counter electrode 106 in all the pixels 110-1 to 110-3. As a result, any of the sub-pixels 110a and 110b exhibits the black color in all the pixels 110-1 to 110-3 as shown in FIG. 11C, and the unit region 120 also exhibits the black color.

Under the state shown in FIG. 11B, each of the sub-pixels 110a and 110b of the pixel 110-1 exhibits the red color, and each of the sub-pixels 110a and 110b of the pixels 110-2 and 11-3 exhibits the black color. In other words, the number of sub-pixels exhibiting the red color under the state shown in FIG. 11B is twice as large as that under the state shown in FIG. 8B. In addition, the reduction in the color purity derived from the white color is not brought about.

It should also be noted that, under the state shown in FIG. 11C, each of the sub-pixels 110a and 110b included in all the pixels 110-1 to 110-3 exhibits the black color. It follows that the number of sub-pixels exhibiting the black color under the state shown in FIG. 11C is twice as large as that under the state shown in FIG. 8C. In addition, the increase in the reflectance derived from the white color is not brought about.

To be more specific, in the case of utilizing the state change among the states shown in FIGS. 11A to 11C, it is possible to increase the contrast, compared with the case of utilizing the state change among the states shown in FIGS. 8A to 8C. It follows that the display 100 shown in FIG. 9 permits displaying a clearer full color image, compared with the display 100 shown in FIG. 5.

Incidentally, the state shown in FIG. 11B and the state shown in FIG. 11C cannot be maintained after the voltage application is stopped. However, the display 100 shown in FIG. 9 permits displaying a full color image by utilizing the state change among the states shown in FIGS. 11A to 11C and also permits displaying a full color image by utilizing the state change among the states shown in FIGS. 8A to 8C. It follows that the display 100 shown in FIG. 9 permits the user to switch the display mode between the low power consumption mode, which utilizes the state change among the states shown in FIGS. 8A to 8C, and the high image quality mode, which utilizes the state change among the states shown in FIGS. 11A to 11C.

Further, the display 100 shown in FIG. 9 permits producing many tones.

FIGS. 12A to 12D are plan views showing the tones that can be realized in the case of employing the pixel arrangement shown in FIG. 7 in the display 100 shown in FIG. 9. Incidentally, FIGS. 12A to 12D show only the states that can be maintained even after stopping the voltage application. In other words, the display 100 shown in FIG. 9 makes it possible to realize furthermore tones during application of the voltage.

In the display 100 according to each of the first and second embodiments of the present invention, it is not absolutely necessary to use the protective cover 107. However, the protective cover 107 is effective for preventing the microcapsules 1, 10, etc. from being damaged. It is possible for the protective cover 107 to be rigid like a plate or to be flexible like a thin plastic sheet. It is also possible for the protective cover 107 to be a thin film obtained by the resin coating and curing of the coated resin layer. Incidentally, where the substrate 101 is flexible, it is possible to make the display 100 itself flexible, if the other constituting elements such as the protective cover 107 are made flexible.

In the display 100 according to each of the first and second embodiments of the present invention, it is possible to omit, for example, the wiring, the switching element 102, the insulating film 103, the pixel electrode 104, the sub-pixel electrodes 104a, 104b, the counter electrode 106 and the protective cover 107. In other words, it is possible for the display 100 to be constituted by the substrate 101 and the electric field sensitive layers 105a, 105b alone. In this case, the voltage application to the electric field sensitive layers 105a and 105b is performed by utilizing an apparatus prepared separately from the display 100. Incidentally, where the size of the pixel is small, it is desirable to provide the display 100 with the wiring, the switching element 102, the insulating film 103, the pixel electrode 104 and/or the sub-pixel electrodes 104a and 104b.

In each of the first and second embodiments of the present invention, it is possible to use, for example, a fluorine-based liquid crystal compound, a cyano-based liquid crystal compound, an ester-based liquid crystal compound or a mixture thereof as the liquid crystal substances 2 and 12.

It is possible for the N-type liquid crystal substance 2 to be formed of, for example, a single kind of liquid crystal compound having a negative dielectric anisotropy, a mixture containing two or more kinds of liquid crystal compounds each having a negative dielectric anisotropy, or a mixture containing a liquid crystal compound having a negative dielectric anisotropy and a liquid crystal compound having a positive dielectric anisotropy, the mixture having as a whole a negative dielectric anisotropy.

On the other hand, it is possible for the P-type liquid crystal substance 12 to be formed of, for example, a liquid crystal compound having a positive dielectric anisotropy, a mixture containing two or more kinds of liquid crystal compounds each having a positive dielectric anisotropy, or a mixture containing a liquid crystal compound having a positive dielectric anisotropy and a liquid crystal compound having a negative dielectric anisotropy, the mixture having as a whole a positive dielectric anisotropy.

The dichroic dye 3 is not particularly limited, as far as the dye has a dichroic ratio larger than 1.5. However, it is desirable for the dichroic dye 3 to have a dichroic ratio equal to or more than 3. The dichroic dye 3 having a large dichroic ratio is advantageous for improving the contrast. Incidentally, it is possible for each of the microcapsules 1 and 10 to contain a single kind of the dichroic dye 3 or two or more kinds of the dichroic dye 3. Also, it is possible for the dichroic dye 3 contained in the microcapsules 1 and 10 included in the single pixel to be equal to each other or different from each other.

As described previously, the isotropic dye 4 is formed of a dye or a pigment having a dichroic ratio equal to or less than 1.5. Incidentally, the pigment that can be used as the isotropic dye 4 is a pigment that does not migrate within the liquid crystal substances 2 and 12 by electrophoresis. Where the microcapsules 1 and 10 contain a pigment as the isotropic dye 4, it is desirable for the pigment to have a mean diameter equal to or less than 0.2 $\mu$m. Where the mean diameter of the pigment is excessively large, the pigment particles tend to be agglomerated and the sedimentation of the agglomerated pigment tends to take place easily. It is possible for each of the microcapsules 1 and 10 to contain a single kind of the isotropic dye 4 or two or more kinds of the isotropic dye 4. It is also possible for the isotropic dye 4 contained in the microcapsules 1 and 10 included in the single pixel to be equal to each other or different from each other.

It is desirable to use anthraquinone dyes excellent in chemical stability as each of the dichroic dye 3 and the isotropic dye 4. Where the dyes 3 and 4 have a low chemical stability, it is possible that the chemical reaction of the dyes 3 and 4 with the surfaces of the particles 5 such as titania fine particles occurs. In this case, it is possible for the chemical structures of the dichroic dye 3 and the isotropic dye 4 to be changed, with the result that the functions of the dichroic dye 3 and the isotropic dye 4 as the dye are impaired.

It is desirable for the amount of the dichroic dye 3 or the isotropic dye 4 relative to the liquid crystal substance 1 or 12 to 0.01% by weight or more, more desirably, to be 0.1% by weight or more. It is also desirable for the amount of the dichroic dye 3 or the isotropic dye 4 relative to the liquid crystal substance 1 or 12 to be 10% by weight or less, more desirably, to be 5% by weight or less. Where the mixing amount of the dyes 3 and 4 is excessively small, it is difficult to improve sufficiently the contrast. On the other hand, where the mixing amount of the dyes 3 and 4 is excessively large, the color is rendered excessively thick, with the result that the contrast also tends to be lowered.

It is desirable for the difference in the dichroic ratio between the dichroic dye 3 and the isotropic dye 4 to be large. It is possible to obtain a high contrast with increase in the difference in the dichroic ratio noted above. It is desirable for the difference in the dichroic ratio between the dichroic dye 3 and the isotropic dye 4 to be 3 or more.

The particles 5 are not particularly limited, as far as the particles 5 are charged particles capable of migration within the liquid crystal substances 2 and 12 by electrophoresis. For example, it is possible to use titania particles, silica particles or alumina particles as the particles 5. It is desirable for the particles 5 to have a mean diameter equal to or less than 0.4 $\mu$m, more desirably equal to or less than 0.2 $\mu$m. Where the particles 5 have an excessively large mean diameter, the response of the particles 5 to the electric field tends to be lowered. Also, if the particles 5 are agglomerated, a large void tends to be formed among the particles 5 in the stage of displaying the white color. What should be noted is that, if the void among the particles 5 is increased in the stage of displaying the white color, it is possible for the reflectance to be lowered. Further, where the particles 5 have an excessively large mean diameter, the liquid crystal alignment tends to be disturbed.

Incidentally, the particles 5 tend to be agglomerated easily in general with decrease in the mean diameter of the particles 5. The agglomerated particles 5 are low in the speed of migration caused by electrophoresis and tend to bring about the sedimentation easily. It follows that, in order to prevent the particles 5 from being agglomerated with each other, it is desirable to cover the surfaces of the particles 5 with, for example, a polymer.

In each of the first and second embodiments of the present invention, it is possible to prepare the microcapsules 1 and 10 by utilizing, for example, the microencapsulating methods such as the membrane emulsifying method, the phase separation method, the submerged drying method, the interfacial polymerization method, the in-situ polymerization method, the submerged cured film method, and the spray drying method.

The materials used for preparing the transparent film 6 include, for example, polyethylenes; chlorinated polyethylenes; ethylene copolymers such as ethylene-vinyl acetate copolymer and ethylene-acrylic acid-maleic anhydride copolymer; polybutadienes; polyesters such as polyethylene terephthalate, polybutylene terephthalate, and polyethylene naphthalate; polypropylenes; polyisobutylenes; polyvinyl chlorides; polyvinylidene chlorides; polyvinyl acetates; polyvinyl alcohols; polyvinyl acetals; polyvinyl butyrals; tetrafluoroethylene resins; trifluoromonochloroethylene resins; fluoroethylene-propylene resins; vinylidene fluoride resins; vinyl fluoride resins; tetrafluoroethylene copolymers such as tetrafluoroethylene-perfluoroalkoxy ethylene copolymer, tetrafluoroethylene-perfluoroalkyl vinyl ether copolymer, tetrafluoroethylene-hexafluoropropylene copolymer, and tetrafluoroethylene-ethylene copolymer; fluorine-containing resins such as fluorine-containing polybenzoxazole; methacrylic resins such as polymethyl methacrylate; polyacrylonitriles; acrylonitrile copolymers such as acrylonitrile-butadiene-styrene copolymer; polystyrenes; halogenated polystyrenes; styrene copolymers such as styrene-methacrylic acid copolymer and styrene-acrylonitrile copolymer; ionic polymers such as polystyrene sodium sulfonate and polysodium acrylate; acetal resins; polyamides such as nylon 66; gelatin; gum arabic; polycarbonates; polyester carbonates; cellulose-based resins; phenol-based resins; urea resins; epoxy resins; unsaturated polyester resins; alkyd resins; melamine resins; polyurethanes; diallyl phthalate resins; polyphenylene oxides; polyphenylene sulfides; polysulfones; polyphenyl sulfones; silicone resins; polyimides; bismaleimide triazine resins; polyimide amides; polyether sulfones; polymethyl pentenes; polyether ether ketones; polyether imides; polyvinyl carbazoles; norbornene-based amorphous polyolefins; and polyfumaric acid esters.

In forming the electric field sensitive layers 105a, 105b by using the microcapsules 1 and 10, it is possible to use a dispersion prepared by dispersing microcapsules in a suitable binder resin as a liquid coating material. In this case, however, the utilization rate of light is decreased, if the amount of the binder resin is excessively large. Therefore, it is desirable for the amount of the binder resin to be 50% by weight or less based on the liquid crystal material. Incidentally, it is possible to use as such a binder resin the thermoplastic resins exemplified above as the materials of the transparent film 6.

Where the binder resin is soluble in water, it is possible to use as E-ink a dispersion prepared by dissolving the binder resin in water and subsequently dispersing the microcapsules in the resultant aqueous solution. On the other hand, where the binder resin is insoluble in water, it is possible to use as E-ink a dispersion prepared by forming an emulsion by using the binder resin and water and subsequently dispersing the microcapsules in the resultant emulsion.

In each of the first and second embodiments of the present invention described above, a dispersion prepared by dispersing the microcapsule 1 or 10 in a liquid material is used as E-ink. However, it is possible to prepare E-ink without utilizing the microcapsules. Where the size of the display 100 is large like the advertising display mounted to, for example, the wall of a building, the size of the pixel is also large in general. In this case, it is possible to form a cell for every pixel or for every sub-pixel and to seal a mixture of the liquid crystal material and the particles 5 as E-ink in these cells.

Some Examples of the present invention will now be described.

EXAMPLE 1

The microcapsule 1 as shown in FIG. 2 was prepared as follows. Specifically, 2 parts by weight of the yellow dichroic dye 3 having the molecular structure shown in formula (1) given below and 2 parts by weight of the blue anthraquinone dye 4 (C.I. Disperse Blue 91) were dissolved in 70 parts by weight of ZLI-2806 (trade name of the nematic liquid crystal substance 2 manufactured by Merc Inc. and having a negative dielectric anisotropy) so as to prepare an N-type liquid crystal material.

(1)

Added to the N-type liquid crystal material thus prepared were 10 parts by weight of a hydrophilic methyl methacrylate monomer, 5 parts by weight of a hydrophobic trifluorobutyl methacrylate monomer, 1 part by weight of ethylene glycol dimethacrylate, which was used as a crosslinking agent, 1 part by weight of benzoyl peroxide, and 9 parts by weight of titania fine particles 5 having a mean diameter of 0.1 $\mu$m so as to prepare a dispersion of the titania fine particles 5. Then, 3 parts by weight of polyvinyl alcohol and 300 parts by weight of pure water were added to the dispersion, and the resultant dispersion was emulsified by a homogenizer, followed by heating the resultant emulsion to 85° C. so as to carry out a polymerization reaction.

After the polymerization reaction was continued for 1 one hour, the reaction mixture was filtered through a filter having a pore diameter of 1 $\mu$m, followed by washing the filtrate three times with a pure water, thereby obtaining microcapsules 1 having a mean diameter of 10 $\mu$m and having a structure that the liquid crystal material and titania fine particles 5 were encapsulated with a transparent polymer film 6. Incidentally, the mean diameter of the microcapsules 1 was controlled by adjusting the stirring speed.

In the next step, the microcapsules 1 thus prepared were dispersed in a dispersion prepared by dispersing vinyl acetate fine particles having a mean diameter of 0.5 $\mu$m in water in a concentration of 5%. The microcapsules 1 were dispersed in the vinyl acetate dispersion in a concentration of 10% so as to prepare an electrophoretic E-ink [1]. A glass substrate having an ITO film formed thereon as an electrode was coated with the E-ink [1] by a screen printing method, followed by drying the coated film. Further, a counter substrate having an ITO film formed thereon as an electrode was placed on the coated film in vacuum so as to prepare a liquid crystal display.

A DC voltage of 10 V was applied between the electrodes of the liquid crystal display so as to gather the titania fine particles 5 on the observer side, with the result that the white color (reflectance of 60%) was displayed. Then, a DC voltage of 10 V was applied in the opposite direction between the electrodes, followed by applying an AC voltage of 10 V having a frequency of 100 Hz between the electrodes, with the result that the black color (reflectance of 5%) was displayed. Further, the voltage application was stopped, with the result that displayed was the blue color.

EXAMPLE 2

The microcapsules 1 were prepared as in Example 1, except that a magenta dye having a molecular structure shown in chemical formula (2) given below was used as the dichroic dye 3, and that 1 part by weight of a cyan dye (C.I. Disperse Blue 99) and 1 part by weight of a yellow dye (C.I. Disperse Yellow 64) were used in combination as the isotropic dye 4.

(2)

$R_1, R_2, R_3, R_4$ = t-Bu, H

The microcapsules 1 thus prepared were dispersed in a dispersion prepared by dispersing vinyl acetate fine particles having a mean diameter of 0.5 $\mu$m in water in a concentration of 5%. The microcapsules 1 were dispersed in the vinyl acetate dispersion in a concentration of 10% so as to prepare an electrophoretic E-ink [2].

Then, the microcapsules 1 were prepared as in Example 1, except that a dichroic dye material LSB318 (trade name of a cyan dye manufactured by Mitsubishi Chemical Co., Ltd.) was used as the dichroic dye 3, and that a red dye (C.I. Disperse Red 56) was used as the isotropic dye 4. The microcapsules 1 thus prepared were dispersed in a dispersion prepared by dispersing vinyl acetate fine particles having a mean diameter of 0.5 $\mu$m in water in a concentration of 5%. The microcapsules 1 were dispersed in the vinyl acetate dispersion in a concentration of 10% so as to prepare an electrophoretic E-ink [3].

In the next step, an ITO film formed on a glass substrate was patterned so as to form first to third sub-pixel electrodes arranged in a triangular form, followed by coating the first sub-pixel electrodes with the E-ink [1] referred to in Example 1 by the screen printing method, followed by drying the resultant films of the E-ink [1]. Then, the second sub-pixel electrodes were coated with the E-ink [2] referred to above by the screen printing method, followed by drying the resultant films of the E-ink [2]. Further, the third sub-pixel electrodes were coated with the E-ink [3] referred to above by the screen printing method, followed by drying the resultant films of the E-ink [3].

Then, a counter substrate having an ITO film formed thereon as a counter electrode was placed on the coated films of the E-ink [1], the E-ink [2] and the E-ink [3] in vacuum so as to prepare a liquid crystal display.

A DC voltage of 10 V was applied between each of the sub-pixel electrodes and the counter electrode of the liquid crystal display so as to gather the titania fine particles 5 on the observer side, with the result that the white color (reflectance of 60%) was displayed. Then, a DC voltage of 10 V was applied in the opposite direction between each of the sub-pixel electrodes and the counter electrode, followed by applying an AC voltage of 10 V having a frequency of 100 Hz between each of the sub-pixel electrodes and the counter electrode, with the result that the black color (reflectance of 6%) was displayed. Further, under the state that the voltage application was stopped, it was possible for the first to third pixels to display 8 kinds of color combinations, i.e., color combinations of (white, white, white), (red, white, white), (white, green, white), (white, white, blue), (red, green, white), (red, white, blue), (white, green, blue) and (red, green, blue)

EXAMPLE 3

The microcapsules 10 shown in FIGS. 3A to 3E were prepared as in the preparation of the microcapsules 1 in Example 1, except that the liquid crystal substance 12 having a positive dielectric anisotropy was used in Example 3 in place of the liquid crystal substance 2 having a negative dielectric anisotropy. Incidentally, ZLI-1840 (trade name of a nematic liquid crystal substance having a positive dielectric anisotropy and manufactured by Merc Inc.) was used as the liquid crystal substance 12. The microcapsules 10 thus prepared were dispersed in a dispersion prepared by dispersing vinyl acetate fine particles having a mean diameter of 0.5 μm in water in a concentration of 5%. The microcapsules 10 were dispersed in the vinyl acetate dispersion in a concentration of 10% so as to prepare an electrophoretic E-ink [4].

Then, the liquid crystal display 100 shown in FIG. 9 was prepared by using the E-ink [1] and the E-ink [4] as follows. In the first step, wirings and the TFTs 102 were formed on the glass substrate 101, followed by coating that surface of the glass substrate 101 on which were formed the TFTs 102, etc. with resin to form a coated film and subsequently curing the coated film so as to form the interlayer insulating film 103. Further, an ITO film was formed on the interlayer insulating film by the sputtering method, followed by patterning the ITO film thus formed so as to form the sub-pixel electrodes 104a and 104b. Then, the sub-pixel electrodes 104a were coated with the E-ink [1] by the screen printing method, followed by drying the resultant coated films so as to form the electric field sensitive layers 105a. Further, the sub-pixel electrodes 104b were coated with the E-ink [4] by the screen printing method, followed by drying the resultant coated films so as to form the electric field sensitive layers 105b. Still further, the glass substrate 107 having an ITO film formed thereon as the counter electrode 106 was placed on the electric field sensitive layers 105a and 105b in vacuum so as to obtain the liquid crystal display 100.

A DC voltage of 10 V was applied between the sub-pixel electrodes 104a and the counter electrode 106 and between the sub-pixel electrodes 104b and the counter electrode 106 of the liquid crystal display 100 so as to gather the titania fine particles 5 on the observer side. As a result, each of the electric field sensitive layers 105a and 105b displayed the white color (reflectance of 60%).

Then, a DC voltage of 10 V was applied in the opposite direction between the sub-pixel electrodes 104a and the counter electrode 106 and between the sub-pixel electrodes 104b and the counter electrode 106, followed by applying an AC voltage of 10 V having a frequency of 100 Hz. Further, the voltage application between the sub-pixel electrodes 104a and the counter electrode 106 was stopped while continuing the AC voltage application between the sub-pixel electrodes 104b and the counter electrode 106, with the result that each of the electric field sensitive layers 105a and 105b displayed the blue color.

Then, the AC voltage application between the sub-pixel electrodes 104b and the counter electrode 106 was stopped and an AC voltage of 10 V having a frequency of 100 Hz was applied between the sub-pixel electrodes 104a and the counter electrode 106, with the result that each of the electric field sensitive layers 105a and 105b displayed the black color (reflectance of 5%).

Further, a DC voltage of 10 V was applied in the opposite direction between the sub-pixel electrodes 104a and the counter electrode 106 and between the sub-pixel electrodes 104b and the counter electrode 106, followed by stopping the voltage application between the sub-pixel electrodes 104a and the counter electrode 106 and between the sub-pixel electrodes 104b and the counter electrode 106. As a result, the electric field sensitive layers 105a displayed the blue color, and the electric field sensitive layers 105b displayed the black color.

EXAMPLE 4

The microcapsules 10 shown in FIGS. 3A to 3E were prepared as in Example 3, except that a magenta dye having a molecular structure as shown in chemical formula (2) given previously was used as the dichroic dye 3, and that 1 part by weight of a cyan dye (C.I. Disperse Blue 99) and 1 part by weight of a yellow dye (C.I. Disperse Yellow 64) were used in combination as the isotropic dye 4. The microcapsules 10 thus prepared were dispersed in a dispersion prepared by dispersing vinyl acetate fine particles having a mean diameter of 0.5 μm in water in a concentration of 5%. The microcapsules 10 were dispersed in the vinyl acetate dispersion in a concentration of 10% so as to prepare an electrophoretic E-ink [5]. Then, the liquid crystal display 100 shown in FIG. 9 was prepared as in Example 3, except that the E-ink [2] and the E-ink [5] were used in Example 4.

A DC voltage of 10 V was applied between the sub-pixel electrodes 104a and the counter electrode 106 and between the sub-pixel electrodes 104b and the counter electrode 106 of the liquid crystal display 100 so as to gather the titania fine particles 5 on the observer side. As a result, each of the electric field sensitive layers 105a and 105b displayed the white color (reflectance of 60%).

Then, a DC voltage of 10 V was applied in the opposite direction between the sub-pixel electrodes 104a and the counter electrode 106 and between the sub-pixel electrodes 104b and the counter electrode 106, followed by applying an AC voltage of 10 V having a frequency of 100 Hz. Further, the voltage application between the sub-pixel electrodes 104a and the counter electrode 106 was stopped while continuing the AC voltage application between the sub-pixel electrodes 104b and the counter electrode 106, with the result that each of the electric field sensitive layers 105a and 105b displayed the green color.

Then, the AC voltage application between the sub-pixel electrodes 104b and the counter electrode 106 was stopped and an AC voltage of 10 V having a frequency of 100 Hz was applied between the sub-pixel electrodes 104a and the counter electrode 106, with the result that each of the electric field sensitive layers 105a and 105b displayed the black color (reflectance of 5%).

Further, a DC voltage of 10 V was applied in the opposite direction between the sub-pixel electrodes 104a and the counter electrode 106 and between the sub-pixel electrodes 104b and the counter electrode 106, followed by stopping the voltage application between the sub-pixel electrodes 104a and the counter electrode 106 and between the sub-pixel electrodes 104b and the counter electrode 106. As a result, the electric field sensitive layers 105a displayed the green color, and the electric field sensitive layers 105b displayed the black color.

EXAMPLE 5

The microcapsules 10 shown in FIGS. 3A to 3E were prepared as in Example 3, except that 2 parts by weight of the dichroic dye material LSB318 (trade name of a cyan dye manufactured by Mitsubishi Chemical Co., Ltd.) was used as the dichroic dye 3, and that 2 parts by weight of a red dye (C.I. Disperse Red 56) was used as the isotropic dye 4. The microcapsules 10 thus prepared were dispersed in a dispersion prepared by dispersing vinyl acetate fine particles having a mean diameter of 0.5 μm in water in a concentration of 5%. The microcapsules 10 were dispersed in the vinyl acetate dispersion in a concentration of 10% so as to prepare an electrophoretic E-ink [6]. Then, the liquid crystal display 100 shown in FIG. 9 was prepared as in Example 3, except that the E-ink [2] and the E-ink [6] were used in Example 5.

A DC voltage of 10 V was applied between the sub-pixel electrodes 104a and the counter electrode 106 and between the sub-pixel electrodes 104b and the counter electrode 106 of the liquid crystal display 100 so as to gather the titania fine particles 5 on the observer side. As a result, each of the electric field sensitive layers 105a and 105b displayed the white color (reflectance of 60%).

Then, a DC voltage of 10 V was applied in the opposite direction between the sub-pixel electrodes 104a and the counter electrode 106 and between the sub-pixel electrodes 104b and the counter electrode 106, followed by applying an AC voltage of 10 V having a frequency of 100 Hz. Further, the voltage application between the sub-pixel electrodes 104a and the counter electrode 106 was stopped while continuing the AC voltage application between the sub-pixel electrodes 104b and the counter electrode 106, with the result that each of the electric field sensitive layers 105a and 105b displayed the red color.

Then, the AC voltage application between the sub-pixel electrodes 104b and the counter electrode 106 was stopped and an AC voltage of 10 V having a frequency of 100 Hz was applied between the sub-pixel electrodes 104a and the counter electrode 106, with the result that each of the electric field sensitive layers 105a and 105b displayed the black color (reflectance of 5%).

Further, a DC voltage of 10 V was applied in the opposite direction between the sub-pixel electrodes 104a and the counter electrode 106 and between the sub-pixel electrodes 104b and the counter electrode 106, followed by stopping the voltage application between the sub-pixel electrodes 104a and the counter electrode 106 and between the sub-pixel electrodes 104b and the counter electrode 106. As a result, the electric field sensitive layers 105a displayed the red color, and the electric field sensitive layers 105b displayed the black color.

EXAMPLE 6

The liquid crystal display 100 shown in FIG. 9 was prepared by using the E-ink [1] and the E-ink [6]. In this Example, employed was the pixel arrangement shown in FIG. 7.

A DC voltage of 10 V was applied between the sub-pixel electrodes 104a and the counter electrode 106 and between the sub-pixel electrodes 104b and the counter electrode 106 in respect of all the pixels 110-1 to 110-3 of the liquid crystal display 100 so as to gather the titania fine particles 5 on the observer side. As a result, each of the electric field sensitive layers 105a and 105b displayed the white color (reflectance of 60%).

Then, a DC voltage of 10 V was applied in the opposite direction between the sub-pixel electrodes 104a and the counter electrode 106 and between the sub-pixel electrodes 104b and the counter electrode 106 in respect of all the pixels 110-1 to 110-3, followed by applying an AC voltage of 10 V having a frequency of 100 Hz. Further, the voltage application between the sub-pixel electrodes 104b and the counter electrode 106 was stopped while continuing the AC voltage application between the sub-pixel electrodes 104a and the counter electrode 106, with the result that each of the electric field sensitive layers 105a and 105b displayed the black color (reflectance of 6%).

Also, according to the liquid crystal display 100, it was possible for each unit region 120 to realize 11 stages of tones in respect of each of the red, green and blue colors. To be more specific, concerning, for example, the red color, it was possible for each unit region 120 to realize 11 stages of tones by the color combinations of (red/red, black/black, black/black), (red/red, black/black, black/white), (red/red, black/black, white/white), (red/red, black/white, white/white), (red/red, white/white, white/white), (red/black, black/black, black/black), (red/black, black/black, black/white), (red/black, black/black, white/white), (red/black, black/white, white/white), (red/black, white/white, white/white), and (red/white, white/white, white/white).

Further, according to the liquid crystal display 100, it was possible for each unit region 120 to realize four stages of tones in respect of each of the red, green and blue colors even under the state of non-application of voltage. To be more specific, concerning, for example, the red color, it was possible for each unit region 120 to realize four stages of tones by the color combinations of (black/red, black/white, black/white), (white/red, black/white, black/white), (white/red, white/white, black/white) and (white/red, white/white, white/white).

COMPARATIVE EXAMPLE 1

A glass substrate having an ITO film formed thereon as an electrode was coated with the E-ink [4] by the screen printing method, followed by drying the resultant coated film. Then, a counter substrate having an ITO film formed thereon as an electrode was placed on the coated film noted above in vacuum so as to prepare a liquid crystal display.

A DC voltage of 10 V was applied between the electrodes of the liquid crystal display so as to gather the titania fine particles 5 on the observer side, with the result that displayed was the white color (reflectance of 60%). Then, a DC voltage of 10 V was applied in the opposite direction between the electrodes, followed by applying an AC voltage of 10 V having a frequency of 100 Hz, with the result that displayed was the blue color. However, the displayed color was changed from blue to black when the AC voltage ceased to be applied between the two electrodes. In other words, it has been confirmed that the liquid crystal display was incapable of performing the memory function in respect of the blue color.

COMPARATIVE EXAMPLE 2

The liquid crystal display 100 shown in FIG. 9 was prepared as in Example 6, except that the dichroic dye 3 was not used.

A DC voltage of 10 V was applied between the sub-pixel electrodes 104a and the counter electrode 106 and between the sub-pixel electrodes 104b and the counter electrode 106 included in the liquid crystal display 100 so as to gather the titania fine particles 5 on the observer side. As a result, each of the electric field sensitive layers 105a and 105b displayed the white color (reflectance of 60%).

Then, a DC voltage of 10 V was applied in the opposite direction between the sub-pixel electrodes 104a and the counter electrode 106 and between the sub-pixel electrodes 104b and the counter substrate 106, with the result that the black color was displayed in each of the unit regions 120. However, the reflectance during the black color display was 20%, which was markedly higher than the reflectance (6%) during the black color display achieved by the liquid crystal display 100 for Example 6.

COMPARATIVE EXAMPLE 3

Microcapsules were prepared as in Example 1 except the conditions described below. Specifically, ZLI-1840 (trade name of a liquid crystal substance having a positive dielectric anisotropy and manufactured by Merk Inc.) was used as the liquid crystal substance 2. The dichroic dye 3 was not added to the liquid crystal substance 2, and a dye prepared by mixing a plural kinds of dyes was used as the isotropic dye 4. To be more specific, the isotropic dye 4 was prepared by mixing a blue anthraquinones dye (C.I. Disperse Blue 91), a cyan dye (C.I. Disperse Blue 99), a yellow dye (C.I. Disperse Yellow 64), and a red dye (C.I. Disperse Red 56). The microcapsules thus prepared were dispersed in a dispersion prepared by dispersing vinyl acetate fine particles having a mean diameter of 0.5 µm in water in a concentration of 5%. The microcapsules were dispersed in the vinyl acetate dispersion in a concentration of 10% so as to prepare an electrophoretic E-ink [7].

Then, an ITO film formed on a glass substrate was patterned so as to form first to third sub-pixel electrodes arranged in a triangular form. These first to third sub-pixel electrodes were coated with the E-ink [7] by the screen printing method, followed by drying the coated films thus formed. Further, a counter substrate, on which a color filter layer and an ITO film as a counter electrode were formed, was placed on the coated film in vacuum so as to prepare a liquid crystal display. Incidentally, the color filter layer included colored layers of red, green and blue in a manner to correspond to the first to third sub-pixel electrodes.

A DC voltage of 10 V was applied between each of the sub-pixel electrodes and the counter electrode included in the liquid crystal display so as to gather the titania particles on the observer side, with the result that displayed was the white color. However, the reflectance during display of the white color was 20%, which was markedly lower than the reflectance (60%) during display of the white color achieved by the liquid crystal display 100 for Example 6. A color filter layer was used in the liquid crystal display for this Example, leading to the low reflectance noted above during display of the white color. Incidentally, a DC voltage of 10 V was applied in the opposite direction between each of the sub-pixel electrodes and the counter electrode, with the result that displayed was the black color (reflectance of 4%).

As described above, the liquid crystal display of the present invention permits displaying a clear full color image during application of the voltage. In addition, according to the present invention, the full color image can be maintained even after stopping the application of voltage. In other words, the present invention makes it possible to realize a liquid crystal display which permits displaying a full color image and which also permits markedly suppressing the power consumption.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display, comprising a substrate and pixels arrayed on the substrate, each of the pixels comprising an electric field sensitive layer which comprises:
    an N-type liquid crystal material containing a liquid crystal substance, a dichroic dye and an isotropic dye; and
    particles dispersed in the N-type liquid crystal material and configured to migrate in the N-type liquid crystal material by electrophoresis.

2. A display according to claim 1, wherein the electric field sensitive layer further comprises a transparent film which encapsulates the N-type liquid crystal material and the particles to form a microcapsule.

3. A display according to claim 1, wherein a dichroic ratio of the dichroic dye is equal to or more than 3.

4. A display according to claim 1, wherein the dichroic dye can exhibit a complementary color of the isotropic dye.

5. A display according to claim 1, wherein each of the pixels is configured to exhibit white, black and a color other than white and black.

6. A display according to claim 1, wherein a mean diameter of the particles is equal to or less than 0.4 µm.

7. A liquid crystal display, comprising a substrate and pixels arrayed on the substrate, each of the pixels comprising:
    a first electric field sensitive layer which comprises
        an N-type liquid crystal material containing a first liquid crystal substance, a first dichroic dye and a first isotropic dye, and
        first particles dispersed in the N-type liquid crystal material and configured to migrate in the N-type liquid crystal material by electrophoresis; and
    a second electric field sensitive layer which is adjacent to the first electric field sensitive layer and comprises
        a P-type liquid crystal material containing a second liquid crystal substance, a second dichroic dye and a second isotropic dye, and
        second particles dispersed in the P-type liquid crystal material and configured to migrate in the P-type liquid crystal material by electrophoresis.

8. A display according to claim 7, wherein the first electric field sensitive layer further comprises a first transparent film which encapsulates the N-type liquid crystal material and the first particles to form a first microcapsule, and the second electric field sensitive layer further comprises a second transparent film which encapsulates the P-type liquid crystal material and the second particles to form a second microcapsule.

9. A display according to claim 7, wherein each of the pixels further comprises a pixel electrode.

10. A display according to claim 9, wherein the pixel electrode comprises a first sub-pixel electrode between the substrate and the first electric field sensitive layer, and a second sub-pixel electrode between the substrate and the second electric field sensitive layer, and each of the pixels further comprises a first switching element electrically connected to the first sub-pixel electrode, and a second switching element electrically connected to the second sub-pixel electrode.

11. A display according to claim 9, wherein each of the pixels further comprises a counter electrode facing the pixel electrode, and the pixel electrode and the counter electrode sandwich the first and second electric field sensitive layers.

12. A display according to claim 7, wherein dichroic ratios of the first and second dichroic dyes are equal to or more than 3.

13. A display according to claim 7, wherein the first dichroic dye can exhibit a complementary color of the first isotropic dye, and the second dichroic dye can exhibit a complementary color of the second isotropic dye.

14. A display according to claim 7, wherein the pixels includes:
a first pixel in which each of the first dichroic dye and the first isotropic dye can exhibit a cyan color, and each of the second dichroic dye and the second isotropic dye can exhibit a red color;
a second pixel in which each of the first dichroic dye and the first isotropic dye can exhibit a magenta color, and each of the second dichroic dye and the second isotropic dye can exhibit a green color; and
a third pixel in which each of the first dichroic dye and the first isotropic dye can exhibit a yellow color, and each of the second dichroic dye and the second isotropic dye can exhibit a blue color.

15. A display according to claim 7, wherein each of the pixels is configured to exhibit white, black and a color other than white and black.

16. A display according to claim 7, wherein mean diameters of the first and second particles are equal to or less than 0.4 $\mu$m.

17. A method of displaying an image, comprising:
changing a state of a first electric field sensitive layer among first to third states, the first electric field sensitive layer comprising an N-type liquid crystal material which contains a first liquid crystal substance, a first dichroic dye and a first isotropic dye, and first particles dispersed in the N-type liquid crystal material and configured to migrate in the N-type liquid crystal material by electrophoresis, wherein
the first state is a state that the first particles are gathered in an observer side region of the first electric field sensitive layer,
the second state is a state that the first particles are gathered in a back side region of the first electric field sensitive layer which is apart from the observer side region of the first electric field sensitive layer and an alternating-current voltage is applied to the first electric field sensitive layer, and
the third state is a state that the first particles are gathered in the back side region of the first electric field sensitive layer and no voltage is applied to the first electric field sensitive layer.

18. A method according to claim 17, further comprising:
changing a state of a second electric field sensitive layer among fourth to sixth states, the second electric field sensitive layer being adjacent to the first electric field sensitive layer and comprising a P-type liquid crystal material which contains a second liquid crystal substance, a second dichroic dye and a second isotropic dye, and second particles dispersed in the P-type liquid crystal material and configured to migrate in the P-type liquid crystal material by electrophoresis, wherein
the fourth state is a state that the second particles are gathered in an observer side region of the second electric filed sensitive layer,
the fifth state is a state that the second particles are gathered in a back side region of the second electric field sensitive layer which is apart from the observer side region of the second electric field sensitive layer and an alternating-current voltage is applied to the second electric field sensitive layer, and
the sixth state is a state that the second particles are gathered in the back side region of the second electric field sensitive layer and no voltage is applied to the second electric field sensitive layer.

19. A method according to claim 18, wherein the first dichroic dye can exhibit a complementary color of the first isotropic dye, and the second dichroic dye can exhibit a complementary color of the second isotropic dye.

20. A method according to claim 18, wherein a color of the first electric field sensitive layer under the second state is equal to a color of the second electric field sensitive layer under the sixth state, and a color of the first electric field sensitive layer under the third state is equal to a color of the second electric field sensitive layer under the fifth state.

* * * * *